United States Patent [19]

Oda et al.

[11] Patent Number: 4,856,970

[45] Date of Patent: Aug. 15, 1989

[54] METAL-CERAMIC COMBINATION

[75] Inventors: Isao Oda; Yoshihiko Ishida, both of Nagoya, Japan

[73] Assignee: NGK Insulators, Ltd., Nagoya, Japan

[21] Appl. No.: 837,203

[22] Filed: Mar. 10, 1986

[30] Foreign Application Priority Data

Mar. 25, 1985 [JP] Japan .................................. 60-60352

[51] Int. Cl.[4] .............................................. F04B 17/00
[52] U.S. Cl. ................................... 417/407; 416/241 B
[58] Field of Search .................... 417/407; 416/244 A, 416/241 B; 403/29, 30, 41, 179, 273; 228/903

[56] References Cited

U.S. PATENT DOCUMENTS

| | | |
|---|---|---|
| 1,794,782 | 3/1931 | Lord . |
| 1,940,870 | 12/1933 | Litton . |
| 2,297,508 | 9/1942 | Schutte . |
| 2,891,525 | 6/1959 | Moore . |
| 2,933,386 | 4/1960 | Pessel . |
| 3,604,819 | 9/1971 | Krahe . |
| 3,666,302 | 5/1972 | Kellett . |
| 3,801,226 | 4/1974 | Bevan et al. . |
| 4,123,199 | 10/1978 | Shimizu et al. . |
| 4,176,519 | 12/1979 | Kronogard . |
| 4,214,906 | 7/1980 | Langer et al. . |
| 4,256,441 | 3/1981 | Arora . |
| 4,279,576 | 7/1981 | Okano et al. . |
| 4,281,941 | 8/1981 | Rottenkolber .................. 416/244 A |
| 4,325,647 | 4/1982 | Maier et al. . |
| 4,341,826 | 7/1982 | Prewo et al. . |
| 4,404,935 | 9/1983 | Kraft . |
| 4,424,003 | 1/1984 | Brobeck .......................... 416/244 A |
| 4,479,293 | 10/1984 | Miller et al. . |
| 4,479,735 | 10/1984 | Thompson et al. . |
| 4,492,737 | 1/1985 | Conoily . |
| 4,503,009 | 3/1985 | Asaka . |
| 4,518,315 | 5/1985 | Kruger ............................ 416/244 A |
| 4,548,786 | 10/1985 | Yohe . |
| 4,614,453 | 9/1986 | Tsuno et al. . |

FOREIGN PATENT DOCUMENTS

| | | |
|---|---|---|
| 139406 | 5/1985 | . |
| 142334 | 5/1985 | European Pat. Off. . |
| 2457231 | 4/1976 | Fed. Rep. of Germany . |
| 2728823 | 1/1979 | Fed. Rep. of Germany . |
| 2845716 | 4/1980 | Fed. Rep. of Germany . |
| 54-42520 | 4/1979 | Japan . |
| 58-214018 | 12/1983 | Japan . |
| 60-50204 | 3/1985 | Japan . |
| 897377 | 11/1953 | Switzerland . |
| 304836 | 4/1955 | Switzerland . |
| 1394919 | 5/1975 | United Kingdom . |
| 2104551 | 3/1983 | United Kingdom . |

OTHER PUBLICATIONS

EP 85 30 0976 European Search Report, 2 pages.
Japanese Patent Abstract 59-103902, Jun. 15, 1984, "Ceramic Vane Wheel".
American Society for Metals; "Properties and Selections: Stainless Steels, Tool Materials and Special Purpose Metals", vol. 3, Ed. 9, U.S. Ohio 1980 . Other reference 687 M.T.Z. Motortechnische Zeitschrift, vol. 44, (1983), June, No. 6, Schwabisch Gmund Deutschland.

Primary Examiner—Carlton R. Croyle
Assistant Examiner—T. S. Thorpe
Attorney, Agent, or Firm—Arnold, White & Durkee

[57] ABSTRACT

In a metal-ceramic combination wherein a monobloc ceramic member comprising a base, a protrusion integrally formed on the base and an easement portion on and around the root of the protrusion, is combined with a metallic member, an improved combination having an excellent strength in total is obtained by fitting the protrusion tightly into a recession or conduit of the metallic member, leaving clearance of 0.5 mm or more between the easement portion and a defined edge of joint interface of the said two members. The combination of the invention is particularly useful for engine parts to be subjected to high temperatures and repeated stresses such as a turbocharger rotor, piston, tappet, rocker arm, exhaust valve, cam and the like.

8 Claims, 6 Drawing Sheets

METAL-CERAMIC COMBINATION

BACKGROUND OF THE INVENTION

1. Field of the Invention

The present invention relates to metal-ceramic combinations and more particularly, to mechanical elements composed of a metallic member and a ceramic member combined with the metallic member.

2. Related Art Statement

Ceramics such as zirconia, silicon nitride, silicon carbide and the like are superior in mechanical strength, heat resistance and abrasion resistance, so that they have drawn attention as materials for structural components to be used in high temperature environments or anti-abrasion parts such as gas-turbine engine parts, diesel engine parts, or the like. However, ceramics are relatively inferior, since generally hard and brittle, to metallic materials in molding and finishing properties. Further, it is difficult to form mechanical elements such as engine parts, from a ceramic material alone, owing to its poor toughness, and therefore, ceramics are generally used in a form of composite structure wherein a metallic member is combined with a ceramic member.

Figure 10:
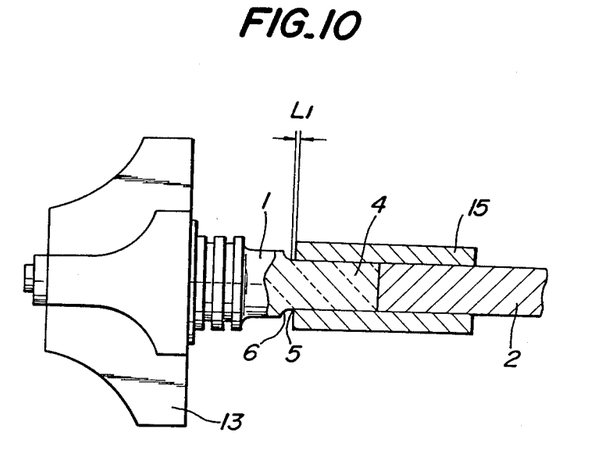
FIGS. 10 and 11 are partly longitudinal sectional views respectively illustrating a structure of conventional metal-ceramic combination.
Figure 11:
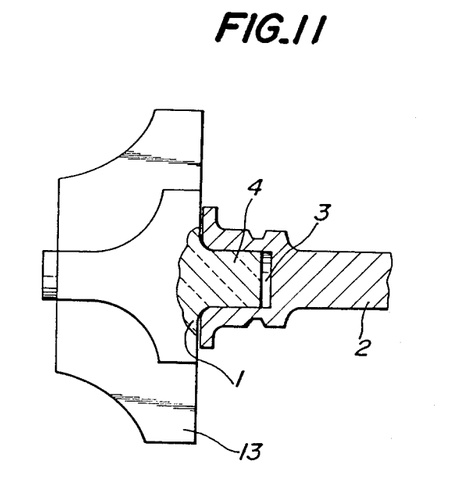

As mechanical composite structures comprising a metallic member and ceramic member in metal-ceramic combinations to be used for engine parts, there are known, for example, a structure as shown in FIG. 10 of the attached drawings, wherein a protrusion is provided en bloc on base 1 of ceramic member, e.g. a revolving shaft of turbine wheel, forming an easement portion on the base and around the root of the protrusion, having its cross-sectional area gradually increasing towards the base. The protrusion is combined with metallic member 2, e.g. a revolving shaft of compressor wheel, by shrink fitting a metallic cylindrical collar 15 on and around the peripheral surfaces of the protrusion and the metallic member (Japanese Patent Application Laid-open No. 57-20,061). Another known structure is shown in FIG. 11, wherein protrusion 4 of a ceramic member, e.g. a revolving shaft of turbine wheel, is fitted tightly into recession 3 provided at an end of metallic member 2, e.g. a revolving shaft of compressor wheel (U.S. Pat. No. 3,666,302).

However, those conventional combination structures have such a shortcoming as follows.

Since the edge of the joint portion of the metallic member is so close to the easement portion of the protrusion of the ceramic member, a large stress concentration develops in the easement. Namely, when a bending load is applied to a metal-ceramic combination having a conventional combination structure as shown in FIG. 10, a stress concentration caused by bending is overlapped on a stress-concentrated portion resulting from shrink fitting, thereby developing into a large stress concentration at the easement portion where the structure will eventually break.

SUMMARY OF THE INVENTION

An object of the present invention is, in a metal-ceramic combination in which a ceramic member is combined with a metallic member by means of shrink fitting, expansion fitting, forcible fitting, binding, brazing, or a combination thereof, to prevent an excessively large stress concentration from being developed caused by overlapping of a stress-concentration formed at an edge of the fitted surfaces or interface, with stress concentration in the ceramic member formed by application of a bending load, and thereby to provide a metal-ceramic combination with an improved strength in total.

The present invention is, in a metal-ceramic combination wherein a protrusion as integrally formed on a base of a ceramic member is provided, an easement portion having a cross-sectional area gradually increasing towards the base is integrally formed on and around the root of the protrusion and the said protrusion is combined with a metallic member by fitting into and/or bonding with a recession or conduit provided in the metallic member. The present invention is an improvement which is characterized in that a clearance of 0.5 mm or more, preferably 1.0 mm or more, is allowed to exist between the edge of the joint interface defined hereinafter and the beginning point of the easement also defined hereinafter.

The term "edge of joint interface" used in this specification and appended claims is defined to mean, as shown in Figures of the attached drawings, edge 5 nearest ceramic base 1, of ceramic member's surfaces in contact with metallic member 2. Also, the term "beginning point of the easement" used herein is defined to mean point 6 where the cross-sectional area of the easement portion on and around ceramic protrusion 4 begins to increase.

BRIEF DESCRIPTION OF THE DRAWING

Some embodiments of the invention will now be described by way of example and with reference to the accompanying drawings in which.

Figure 1:
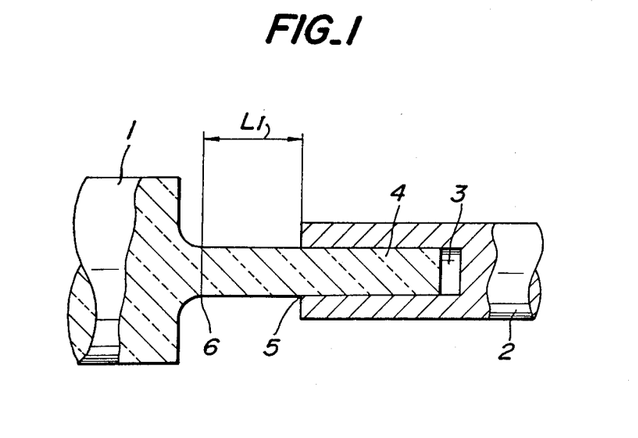
FIGS. 1, 2, 3 and 4 are longitudinal sectional views respectively illustrating a metal-ceramic combination, an embodiment of the present invention.

In FIG. 1, ceramic member 1 is combined with metallic member 2, by fitting protrusion 4 provided integrally on base 1 of the ceramic member tightly into recession 3 provided in metallic member 2, in such a manner that clearance $L_1$ is left between edge 5 of joint interface and beginning point 6 of the easement.

In the metal-ceramic combination according to the present invention, a clearance $L_1$ of 0.5 mm or more is provided between edge 5 of joint interface and beginning point 6 of the easement, so that stress concentration formed by application of a bending load and a stress-concentrated portion formed by combining may not be overlapped, thus preventing development of an excessively large stress concentration otherwise to be resulted from composite of both the stress concentrations. The dimension of clearance $L_1$ is preferably 0.5 mm or more and particularly preferably when 1 mm or more.

In the case where clearance $L_1$ is smaller than 0.5 mm, stress concentration in the combination formed by application of a bending load is overlapped on and compounded with a stress-concentrated portion resulted from the combining, thereby developing into a large stress concentration, so that it is not preferred owing to the fact that the root of ceramic protrusion is apt to break in the course of combination of a metallic member with a ceramic member or during finishing or using of the metal-ceramic combination.

According to the invention, the combination of recession 3 on the metallic member with protrusion 4 on the ceramic member can be effected by means of fitting and/or bonding.

Among the above, the fitting can be performed by any of shrink fit, expansion fit and forcible fit. Since, in the shrink fit and expansion fit, the protrusion of ceramic member is finished so that its outside diameter (hereinafter referred to as O.D.) may be larger than the inside diameter (hereinafter referred to as I.D.) of the recession or conduit of metallic member, then one of these members are heated or cooled to create a dimensional difference large enough to enable those members to fit together. Thereafter, utilizing the dimensional difference, those members are tightly fitted together, so that those are preferable methods for combining members such as having a fitted portion relatively large in dimension.

On the other hand, the forcible fit is a method of fitting by applying a pressing load to the protrusion of ceramic member to push forcibly into the recession or conduit of metallic member. Since the above-mentioned dimensional difference between O.D. of the ceramic protrusion and I.D. of the recession or conduit of metallic member is absorbed by deformation of the metallic member, the tolerances in finished dimension of O.D. of the ceramic protrusion and the I.D. of the recession or conduit of metallic member before forcible fit, i.e. push-in-fit, may be larger than those in cases of shrink fit and expansion fit. Therefore, the forcible fit is preferred as a method for combining members such as having a fitted portion relatively small in dimensions. The shape and size of portions to be forcibly fitted together are properly designed so that the ceramic member or metallic member may not be broken by the stress applied thereto during push-in-fitting. Besides, the dimensional difference between the O.D. of the protrusion of ceramic member and the I.D. of the recession or conduit of metallic member is properly determined so that the fitted portion can possess a sufficiently large clamping force corresponding to use conditions of the metal-ceramic combination of the present invention, while both the ceramic member and metallic member may not break during push-in-fitting. For this purpose, the above-mentioned dimensional difference is preferable when the O.D. of the protrusion of ceramic member is 0.1%–10% larger than I.D. of the recession or conduit of ceramic member and more preferable when 1%–5% larger. If the dimensional difference is smaller than 0.1%, the clamping force of forcibly the fitted portion is so insufficient that there are fears of separation by slipping out or loosening of the forcibly fitted portion during using, and so it is not preferable. When the dimensional difference exceeds 10%, the ceramic member or metallic member may break during push-in-fitting, so it is also not preferable. Further, a stable joint strength can be obtained by setting the above-mentioned dimensional difference relatively large when hardness of the portion to be fitted of metallic member is low, or relatively small when the hardness is high. The forcible fit may be performed either at room temperature or by heating the metallic member only, or both the metallic member and ceramic member. However, the forcible fit process performed by heating both members is most preferable. Because, the heating of both members will reduce resistance to deformation of the metallic member, whereby a load required for pushing-in can be decreased, so that breakage of the ceramic member or metallic member will not occur. Moreover, the clamping force will increase, based on a difference in thermal expansion between the both members, during cooling from forcible fit temperatures. It is preferred that the heating temperature at which both the ceramic member and metallic member are heated during forcible fitting, is selected to be not higher than either lower one of heat-treatment temperature of metallic member or softening temperature of surface hardened layer of metallic member, and moreover, be not lower than a use temperature of the forcibly fitted portion.

Here, the heat-treatment temperature of metallic member is meant to imply a heat-treatment temperature for adjusting the hardness of metallic member, which is equivalent to, for instance, a precipitation hardening treatment temperature when the metallic member comprises a precipitation hardening type alloy or a temper temperature in the case of a quench hardened steel. Further, the softening temperature of the surface hardened layer of metallic member is equivalent to a softening temperature of nitride layer when the surface hardening has been effected by nitriding, and to a temper temperature when by surface quenching.

Further, to fabricate the metal-ceramic combination of the present invention, the ceramic member and metallic member may be bonded with each other by means of bonding using a heat-resistant adhesive or brazing. In the case where the bonding is effected by the brazing, a metallic layer is provided in advance on surfaces to be bonded of ceramic member. The metallic layer can be provided by a process comprising applying a pasty composition containing metallic powder as a main component on surfaces of ceramic member and drying followed by burning, or a process for evaporating metallic layer onto surfaces of ceramic member by means of physical or chemical sputtering. The ceramic member provided with metallic layers may be bonded with the metallic member by conventional processes using a brazing alloy commercially available.

Further, besides the above-mentioned processes, the ceramic member and metallic member can be bonded directly with each other by using a brazing alloy containing an active metal, without providing metallic layers on surfaces of the ceramic member. As an active metal, use can be made of a metal such as tantalum, aluminum, cerium, titanium, zirconium and the like when the ceramic is a nitride, and chromium, tantalum, titanium, zirconium, molybdenum and the like when the ceramic is a carbide.

Furthermore, as a metal material composing the metal-ceramic combination of the present invention, precipitation hardening type alloys or any commercially available metal materials can be used which can undergo surface hardening by means of nitriding, carbonitriding, surface quenching, induction hardening, electro-discharge hardening, plating, or a combination thereof.

In the case where the metal-ceramic combination of the present invention is utilized to fabricate a turbocharger rotor, surfaces of a metallic arbor, i.e. a metallic member, are hardened, whereby abrasion resistance of surfaces to contact with bearings, of the metallic arbor, is improved. When a precipitation hardening type alloy is employed as a material for the metallic arbor, the precipitation hardening treatment is effected after a ceramic arbor, i.e. ceramic member, has been combined with the metallic arbor. As a precipitation hardening type alloy in such a case, is preferable at least any one of maraging steels, precipitation hardening type stainless steels and precipitation hardening type super alloys.

Further, in the case where the hardening of the metallic member is effected by nitriding, is preferably employed at least any one of chrome-containing alloys such as stainless steels, nickel-chrome-molybden steels, chrome-molybden steels, aluminum-chrome-molybden steels, alloy tool steels and the like. Furthermore, when the hardening of the metallic arbor is effected by surface quenching, at least any one of nickel-chrome-molybden steels, chrome-molybden steels, nickel-chrome steels and chrome steels is preferred.

Such a surface hardening of the metallic arbor may be performed either before or after combining of a ceramic arbor with the metallic arbor, and, however, it is preferred to perform before finishing of the metallic member.

Figure 2:
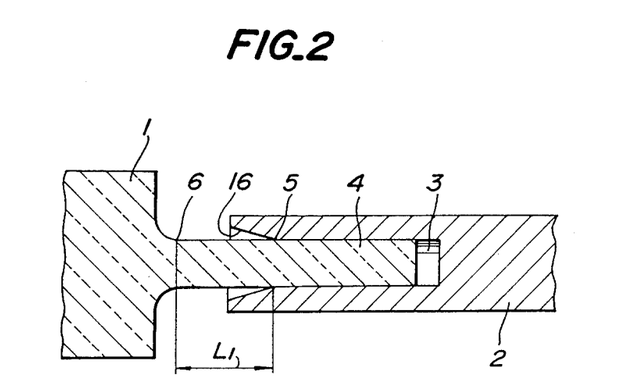

The endmost surface near ceramic member, of metallic member may be a plane perpendicular to the longitudinal axis of the member as shown in FIG. 1, or may be reverse conical surface 16 shown in FIG. 2. The longitudinal section along the axis of reverse cone 16 may comprise straight lines as shown in FIG. 2, or curved lines.

Figure 3:
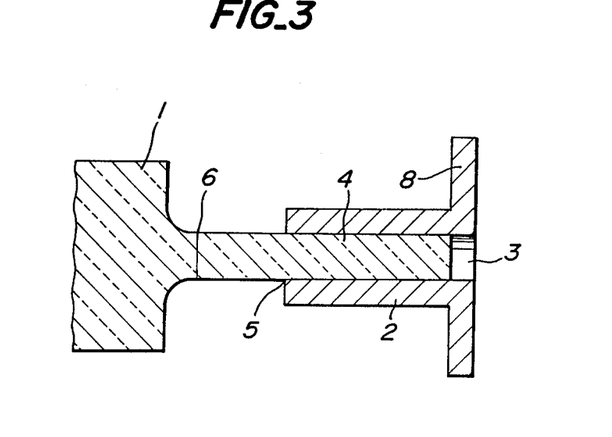

FIG. 3 is a longitudinal sectional view of an embodiment of the metal-ceramic combination according to the invention which comprises fitting protrusion 4 of ceramic member 1 tightly into conduit 3 of a cylindrical metallic member provided at one end of its cylinder 2 with flange 8 having a diameter larger than O.D. of the cylinder. By this flange 8, the metal-ceramic combination of the present invention can be combined with another metallic member.

Figure 4:
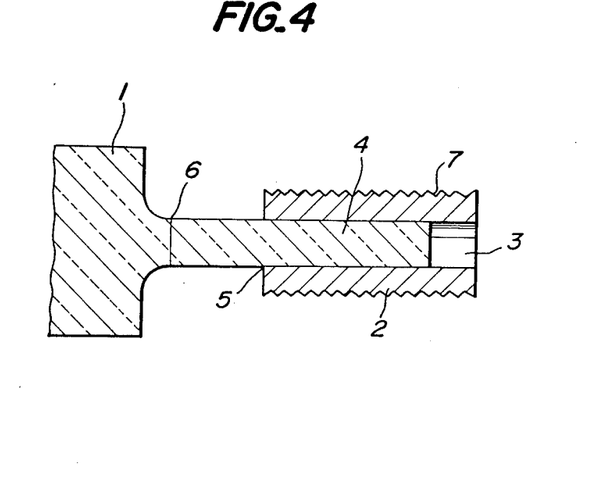

FIG. 4 is a longitudinal sectional view of an embodiment of the metal-ceramic combination according to the invention which comprises fitting protrusion 4 of ceramic member tightly into conduit 3 of cylindrical metallic member 2 provided at least one end of its cylinder with screw 7. By this screw 7, another metallic member can be incorporated with the cylinder of metallic member of the metal-ceramic combination according to the present invention.

Figure 5:
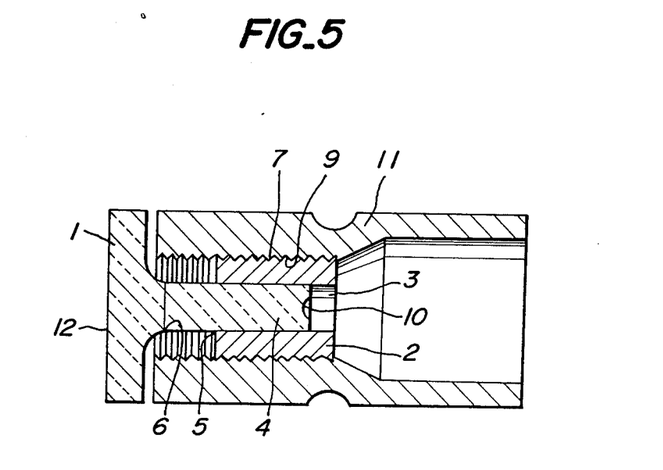
FIG. 5 is a longitudinal sectional view illustrating a structure of a tappet which is an embodiment of the metal-ceramic combination according to the present invention.

FIG. 5 shows a tappet comprising ceramic surfaces 12 and 10 to contact respectively with a cam and a pushrod, which is formed by providing metallic tappet body 11 with perforation 3 such that a metal-ceramic combination according to the invention can be plugged into from the cam-contact side and fixing the metal-ceramic combination of the invention to the said metallic tappet body with screw 9 provided on the inner surface of the perforation and screw 7 provided on the peripheral surface of metallic member 2 of the metal-ceramic combination according to the invention. Since the cam-contact surface can be made of a ceramic having a superior abrasion resistance, by fitting the metal-ceramic combination of the invention, the tappet according to the present invention can be provided with an excellent durability.

Figure 6:
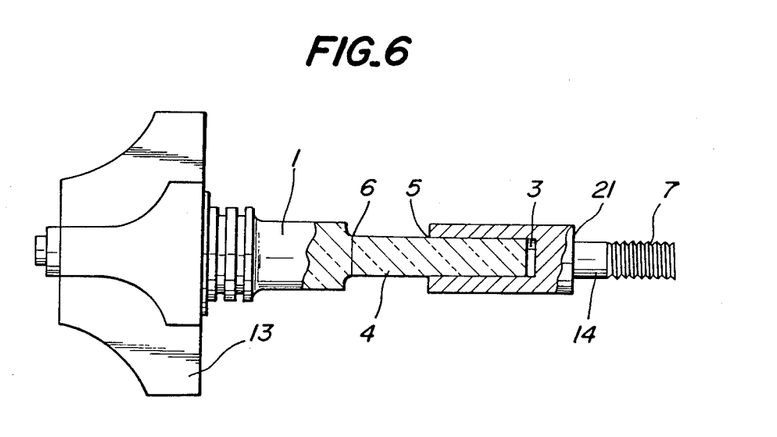
FIG. 6 is a partly longitudinal sectional view showing a fit-joint of a turbocharger rotor which is an embodiment of the metal-ceramic combination according to the present invention.

FIG. 6 shows a turbocharger rotor which is an embodiment of the metal-ceramic combination of the present invention, wherein protrusion 4 formed integrally on ceramic turbine wheel 13 is fitted tightly into recession 3 provided in a head of steel revolving shaft 14 of a compressor wheel. The turbocharger rotor comprising a metal-ceramic combination of the present invention composed of a ceramic turbine wheel, a ceramic shaft formed integrally thereupon and a metallic shaft fixed on the ceramic shaft can be, since its turbine is composed of a light weight ceramic having a superior high temperature strength, provided with a high efficiency.

Figure 7:
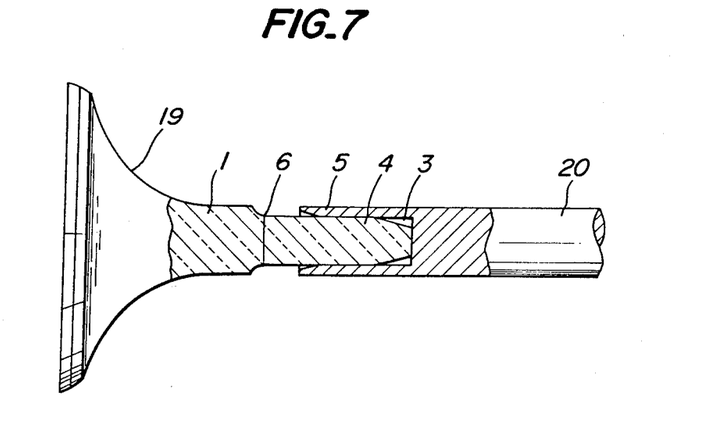
FIG. 7 is also a partly longitudinal sectional view showing a fit-joint of an exhaust valve which is an embodiment of the metal-ceramic combination according to the present invention.

FIG. 7 shows an exhaust valve which is an embodiment of the metal-ceramic combination of the present invention, wherein protrusion 4 formed integrally on base 1 of ceramic valve body 19 by the valve stem side is fitted tightly into recession 3 provided in metallic valve stem 20. By forming a ceramic member into a light weight valve body having a superior heat resistance, it is possible to provide a light weight exhaust valve and having an excellent heat resistance.

Next, reasons of limitations set up in the present invention will be explained based upon a test result hereafter.

Figure 8:
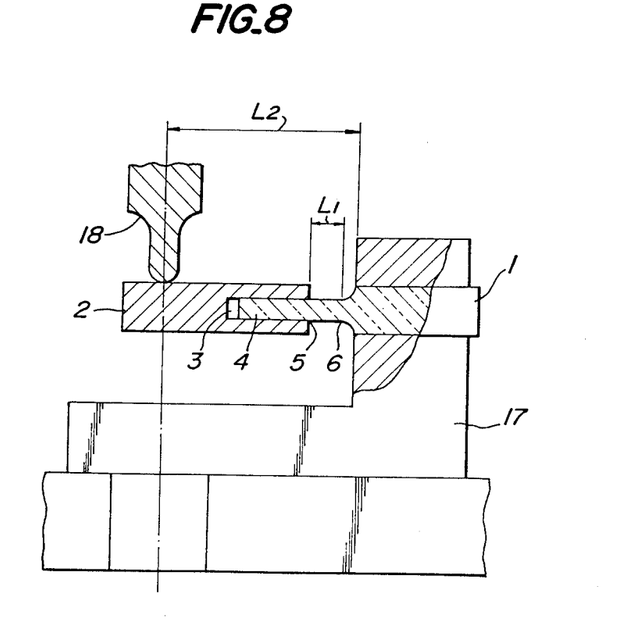
FIG. 8 is a partly longitudinal sectional, elevational view, illustrating a bending test method for the metal-ceramic combination of the present invention.

As a test-piece, was used a metal-ceramic combination formed as shown in FIG. 1, wherein a silicon nitride ceramic member comprising thick portion 1 of 10 mm diameter, thin portion 4, 30 mm long of 7 mm diameter and an easement portion transiting from the thick portion to the thin portion with a radius of curvature of 4.0 mm, was fitted with annealed chrome-molybden steel (JIS SCM 435) metallic member 2 comprising a cylindrical portion of 9 mm O.D. and 6.8 mm I.D. Using a bending test machine as shown in FIG. 8, the above-mentioned test-piece was tested for bending strength according to cantilever method wherein span $L_2$ was fixed at 40 mm and distance $L_1$ was varied from 0 to 4 mm between edge 5 of joint interface and beginning point 6 of the easement.

Figure 9:
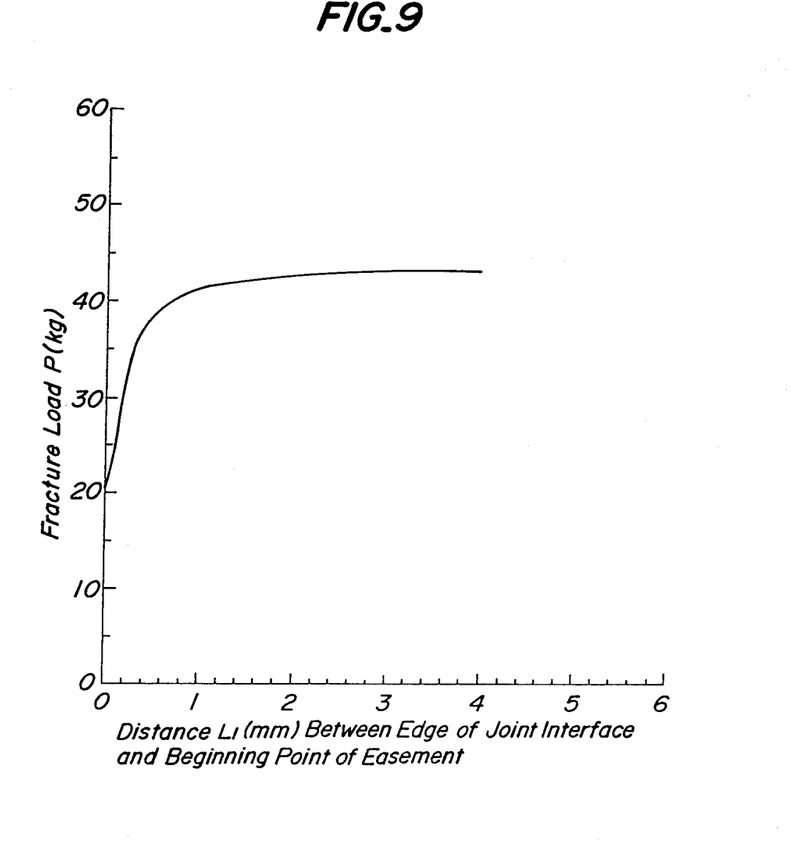
FIG. 9 is a plot of bending loads at break, i.e. bending strength characteristics, versus distances between the edge of joint interface and the beginning point of the easement.

FIG. 9 shows the result of the above bending test, that is a plot of distance $L_1$, on the abscissa, between edge 5 of joint interface and beginning point 6 of the easement, versus a fracture load for the ceramic member, on the ordinate. As is clear from FIG. 9, the fracture load begins to decrease at distance $L_1$ of less than 1 mm, then decreases drastically as the distance reaches less than 0.5 mm, and when $L_1$ is 0 mm, eventually becomes about ½ or less as compared with that when $L_1$ is sufficiently large. Accordingly, it is preferred that distance $L_1$ between edge 5 of joint interface and beginning point 6 of the easement is 0.5 mm or more and particularly preferable when 1 mm or more.

Ceramic materials constituting the metal-ceramic combinations of the present invention may be selected, according to their intended uses, from silicon nitride, silicon carbide, SIALON, zirconia, alumina, mullite, beryllia, etc. When, for example, a turbocharger rotor is composed of a metal-ceramic combination of the invention, its turbine wheel to be subjected to high temperatures is desired to consist of silicon nitride or silicon carbide having an excellent high temperature strength.

Further, when a tappet having a ceramic, cam-contact surface is composed of a metal-ceramic combination of the invention, zirconia or silicon nitride which is superior in strength and toughness is desirably employed as the ceramic material.

Furthermore, the ceramic member and metallic member constituting the metal-ceramic combination of the present invention can consist respectively of more than one of materials. For instance, when a gas-turbine rotor is composed of a metal-ceramic combination of the invention, the ceramic turbine-wheel part to be subjected to high temperatures is formed from silicon carbide having excellent high temperature strength, anti-creeping and anti-oxidizing abilities. The ceramic arbor part to be exposed to a temperature lower than that for the turbine wheel, is made of silicon nitride having a superior toughness, the thus made both parts are bonded with each other by a heat-resistant adhesive, etc., to form a ceramic member, and then a gas-turbine rotor having excellent heat-durability, high strength and high toughness can be obtained.

A gas-turbine rotor having a metallic revolving shaft, i.e. a metallic member can lower the cost required for its manufacture as maintaining its whole reliability, by forming the part of the metallic revolving shaft near the ceramic rotor, for which heat-resistance is required, from a heat resistant alloy, the other part to be subjected to lower temperatures, from a low price metal, and thereafter combining those two parts together to fabricate the metallic revolving shaft.

Some of the preferred embodiments of the present invention will be illustrated by way of the following examples.

EXAMPLE 1

A ceramic round rod 60.0 mm long and 9.0 mm O.D. was manufactured from silicon nitride by a normal pressure sintering process. At one end of this ceramic rod member, was provided coaxially a protrusion 40.0 mm long and 5.0 mm O.D. on and around the root of which was integrally formed an easement portion having its cross-sectional area increasing towards the base of protrusion with a radius of curvature of 1.0 mm in its longitudinal cross-section. On the other hand, two metallic round rods each 50.0 mm long and 9.0 mm O.D. made of aluminum-chrome-molybden steel (JIS SACM 645) were provided at their one end with a recession of 4.98 mm I.D. and respectively 38.0 mm and 38.8 mm deep, and thus metallic members were manufactured. Those metallic members were respectively shrink fitted on the protrusion of ceramic member at 500° C., thereby to form the following two kinds of test-pieces of metal-ceramic combination.

Test-piece A was a metal-ceramic combination having the features of the present invention, which had a distance of 1.0 mm between the edge of joint interface and the beginning point of the easement.

Test-piece B was a metal-ceramic combination, not satisfying the requirements of the present invention, which had a distance of 0.2 mm between the edge of joint interface and the beginning point of the easement.

The above-mentioned test-pieces A and B thus fabricated were subjected to bending test with a bending test machine as shown in FIG. 8. Conditions of the bending test were: span $L_2$ in FIG. 8 was 40.0 mm and the loading rate 0.05 mm/min.

The result of the bending test showed that the fracture load for test-piece A was 21.0 kg, while that for test-piece B 12.4 kg, and thus it was confirmed that the metal-ceramic combination of the present invention was particularly excellent in bending strength as compared with that not satisfying the requirements of the present invention.

EXAMPLE 2

A ceramic member having an overall length of 72.0 mm consisting of a turbine wheel of 61.0 mm O.D. and a shaft of 8.5 mm O.D. was formed as a unitary body from silicon nitride by a normal pressure sintering process. The shaft of this ceramic member was shaped to have a protrusion 15 mm long and 6.0 mm O.D., a base having a radius of 4.0 mm and an easement portion on and around the root of the protrusion.

Then, two precipitation hardening type stainless steel (JIS SUS 630) members 60.0 mm long and 9.0 mm O.D. which had been subjected to solution treatment, were provided at their one end with a recession of 5.8 mm I.D. and 14.0 mm and 14.7 mm deep respectively. The protrusion on the top of the above-mentioned ceramic shaft member was forcibly pushed into the recession of the metallic members at 350° C., thereby to form two metal-ceramic combinations having a distance of 1.0 mm and 0.3 mm respectively between the edge of the joint interface and the beginning point of the easement. The metal-ceramic combinations were heated at 420° C. for 10 hours and hardened. Thereafter, in order to form the metal-ceramic combination into a turbocharger rotor having a shape as shown in FIG. 6, the periphery of the metallic member was so finished. At the side of compressor wheel, the revolving shaft of the turbocharger rotor was finished into a shape having 5.0 mm O.D. as shown in FIG. 6. On revolving shaft 14 by the side of compressor wheel, an aluminum alloy (JIS AC4C) cylinder 25.0 mm long, 5.2 mm I.D. and 30.0 mm O.D. was fitted and fixed with a tightening torque of 50 kg.cm between end surface 21 and a nut set on screw 7 threaded on the end of revolving shaft by the side of compressor wheel. This turbocharger rotor was mounted on a high temperature revolution testing machine and tested for revolution by burning gas. As for the combination having distance $L_1$ of 1.0 mm between the edge of joint interface and the beginning point of the easement, nothing abnormal was observed even after 1 hour test-running at 150,000 r.p.m., while that having distance $L_1$ of 0.3 mm fractured when the increasing revolution reached at 100,000 r.p.m.

EXAMPLE 3

A ceramic member consisting of a valve body 30 mm high and 40 mm O.D. and an axis 25 mm long and 13 mm O.D. was formed as a unitary body from silicon nitride by a normal pressure sintering process. The axis of this ceramic member was shaped into a protrusion 20 mm long and 9 mm O.D. having a radius of curvature of 1.0 mm at the easement portion of its root.

Further, two aluminum-chrome-molybden steel (JIS SACM 645) members having an overall length of 200 mm and O.D. of 13.0 mm were formed into metallic valve stems provided at their one end with a recession of 8.8 mm I.D. and 14 mm and 19 mm deep respectively.

The protrusion of the above-mentioned ceramic member was forcibly pushed into the recession of those metallic valve stems at 350° C., so that distance $L_1$ may be 0.1 mm and 5.0 mm respectively, between the edge of joint interface and the beginning point of the easement, in the fabricated metal-ceramic combination as shown in FIG. 7.

Thereafter, in order to form the metal-ceramic combination into an exhaust valve having a shape as shown in FIG. 7, the periphery of the metallic member, i.e. the metallic valve stem, was so finished. During the above-mentioned finishing, the metal-ceramic combination having distance $L_1$ of 0.1 mm was broken at the base of the easement portion of ceramic member.

On the other hand, the metal-ceramic combination having distance $L_1$ of 5.0 mm was able to be formed, with no problems, into an exhaust valve as shown in FIG. 7.

As is clear from the above, the metal-ceramic combination of the present invention is provided with a clearance of 0.5 mm or more between the edge of joint interface and the beginning point of the easement, so that even if a bending load is applied to the metal-ceramic combination of the present invention, stress concentration caused by bending is not overlapped on the stress concentration resulted from combination and, therefore, it can withstand, since the formed stress is so small, such a load as larger than a fracture load for conventional metal-ceramic combinations. Furthermore, for a same load, the ceramic member can be formed into a smaller size.

Particularly, a turbocharger rotor comprising a metal-ceramic combination according to the present invention wherein a metallic shaft is combined with a ceramic turbine wheel by a ceramic shaft connecting to the turbine wheel, since the turbine is light weight and is composed of ceramics having an excellent high temperature strength, can be made into a turbocharger rotor of high efficiency.

A tappet can be provided with its cam-contact surface of high abrasion-resistance also by fitting a metal-ceramic combination according to the present invention thereinto. Therefore a tappet having an excellent durability can be produced.

Further, in an exhaust valve, a light weight exhaust valve having an improved heat resistance can be obtained also by incorporating a metal-ceramic combination of the invention therein.

As described above, by using the metal-ceramic combination of the invention per se or further combining with other metallic members, the metal-ceramic combination according to the present invention can apply to structural parts to suffer high temperatures and/or repeated stresses, for instance, engine parts and the like such as a turbocharger rotor, piston, tappet, intake or exhaust valve, rocker arm, cam, or the like, making the most of heat resistance, oxidation resistance, heat insulating ability, light weighing property and high temperature strength, of ceramics.

While there has been shown and described what are considered the preferred embodiments of the invention, it will be obvious to those skilled in the art that various alterations, modifications and applications may be made therein without departing from the scope of the invention as defined by the appended claims.

What is claimed is:

1. A metal-ceramic combination comprising:
   a ceramic member including a base portion, a protrusion extending from and integrally formed with said base portion, and an easement portion formed between said base portion and said protrusion, said easement portion having a cross-sectional area which gradually increases from said protrusion toward said base portion;
   a metallic member having a recess or bore in which said protrusion is fitted to form a contact surface therebetween, an outside diameter of said protrusion being 0.1–10% larger than an inside diameter of said recess or bore before fitting of said protrusion into said recess or bore; and
   wherein a clearance of at least 0.5 mm exists between an interface of said protrusion and said easement portion and an interface of said protrusion and said metallic member closest to said base portion.

2. A metal-ceramic combination as claimed in claim 1, wherein the said clearance is 1.0 mm or more.

3. A metal-ceramic combination as claimed in claim 1, wherein the ceramic member comprises at least one ceramic material selected from the group consisting of silicon nitride, silicon carbide, SIALON, zirconia, mullite, alumina and beryllia.

4. A metal-ceramic combination as claimed in claim 1, wherein the ceramic member is a part of a revolving shaft, at the side of a turbine wheel, of a turbocharger rotor and the metallic member is a part of a revolving shaft, at the side of a compressor wheel, of the turbocharger rotor.

5. A metal-ceramic combination as claimed in claim 1, wherein at least a part of the metallic member has been hardened by a treatment selected from the group consisting of precipitation hardening, nitriding, induction hardening and a combination thereof.

6. A metal-ceramic combination as claimed in claim 5, wherein the metallic member comprises at least one metal selected from the group consisting of stainless steels, nickel-chrome-molybden steels, chrome-molybden steels, aluminum-chrome-molybden steels, maraging steels and precipitation hardening type super alloys.

7. A metal-ceramic combination as claimed in claim 1, wherein the ceramic member is used as a part of a cam-contact portion of a tappet and a metallic member as a tappet body or a means of combining the ceramic member with a tappet body.

8. A metal-ceramic combination as claimed in claim 1, wherein the ceramic member is at least a part of a valve body of an exhaust valve and the metallic member a valve stem of the exhaust valve.

* * * * *